United States Patent [19]

Lloyd

[11] 4,316,554
[45] Feb. 23, 1982

[54] AERIAL MARKER LAUNCHER

[75] Inventor: William R. J. Lloyd, Tacoma, Wash.

[73] Assignee: Pacific Paper Products, Inc., Tacoma, Wash.

[21] Appl. No.: 123,897

[22] Filed: Feb. 22, 1980

[51] Int. Cl.³ .............................................. B64D 1/02
[52] U.S. Cl. ................................... 221/232; 116/209; 221/279; 244/137 R
[58] Field of Search ...................... 116/209; 222/279; 244/136, 137 R; 221/226, 230

[56] References Cited

U.S. PATENT DOCUMENTS

| | | | |
|---|---|---|---|
| 2,534,169 | 12/1950 | Hope | 312/43 |
| 2,966,674 | 12/1960 | Clark | 340/366 |
| 3,095,814 | 7/1963 | Jansen et al. | 244/136 |
| 3,164,801 | 1/1965 | Nicholl | 116/209 X |
| 3,428,019 | 2/1969 | Tillay et al. | 116/209 |
| 3,470,846 | 10/1969 | Tillay et al. | 116/209 |
| 3,565,284 | 2/1971 | Hinterreiter | 221/232 X |
| 3,578,207 | 5/1971 | Danow | 221/232 |
| 4,190,420 | 2/1980 | Covington et al. | 221/279 |

Primary Examiner—Daniel M. Yasich
Attorney, Agent, or Firm—Eugene D. Farley

[57] ABSTRACT

An aerial marker launcher for dropping markers from an aircraft to the ground to form a readily visible indication of the path of the aircraft. The launcher includes a container mounted on the wing of an aircraft, the container configured to hold a stack of markers and having an ejection opening in one end. An ejection means is mounted at the ejection opening and is pilot controllable to eject the markers one at a time. A pusher plate at the end of the stack is operable to urge the markers toward the ejection opening. Attached to the pusher plate is a spring assembly having a resilient retractable extension member, under tension, extending therefrom and attached to the container adjacent the ejection opening for urging the pusher plate resiliently toward the ejection opening.

4 Claims, 7 Drawing Figures

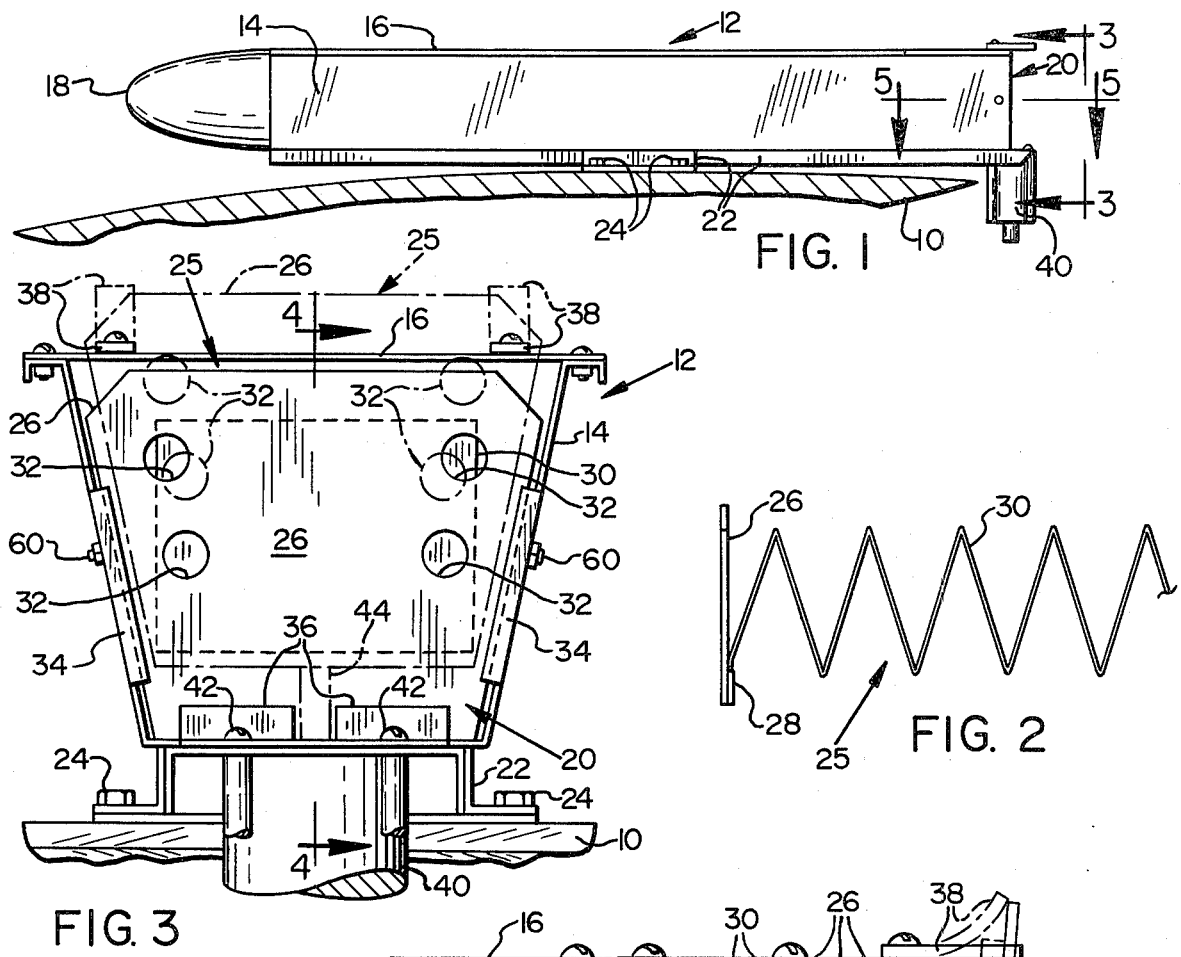
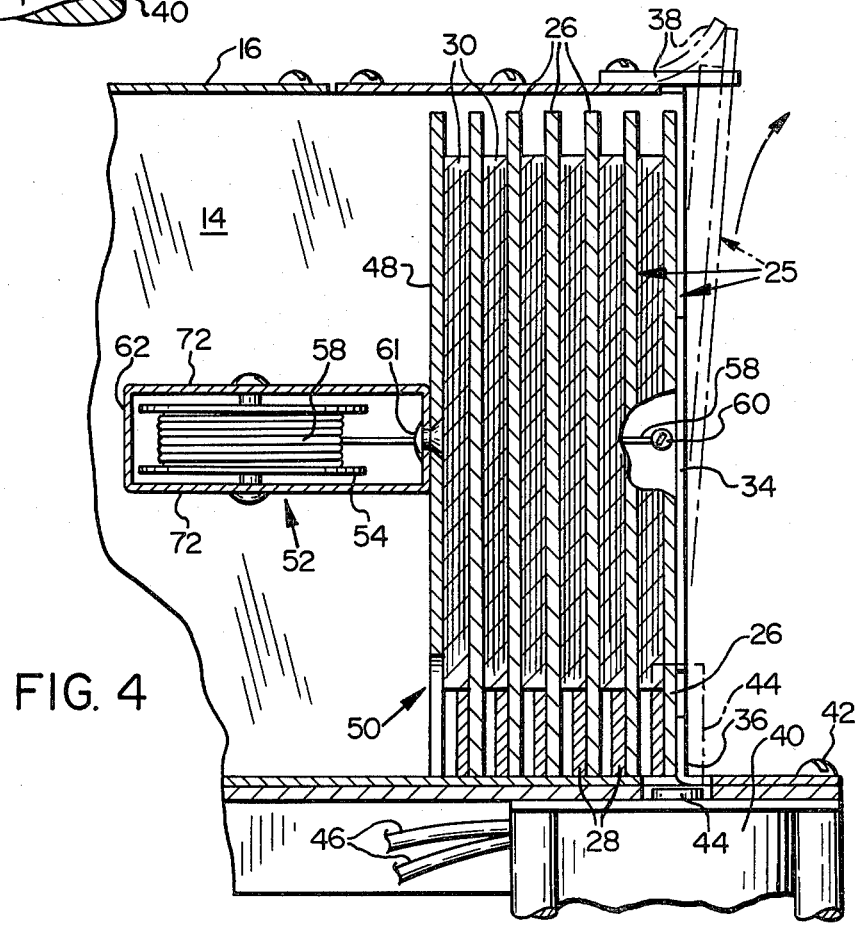
FIG. 1
FIG. 2
FIG. 3
FIG. 4

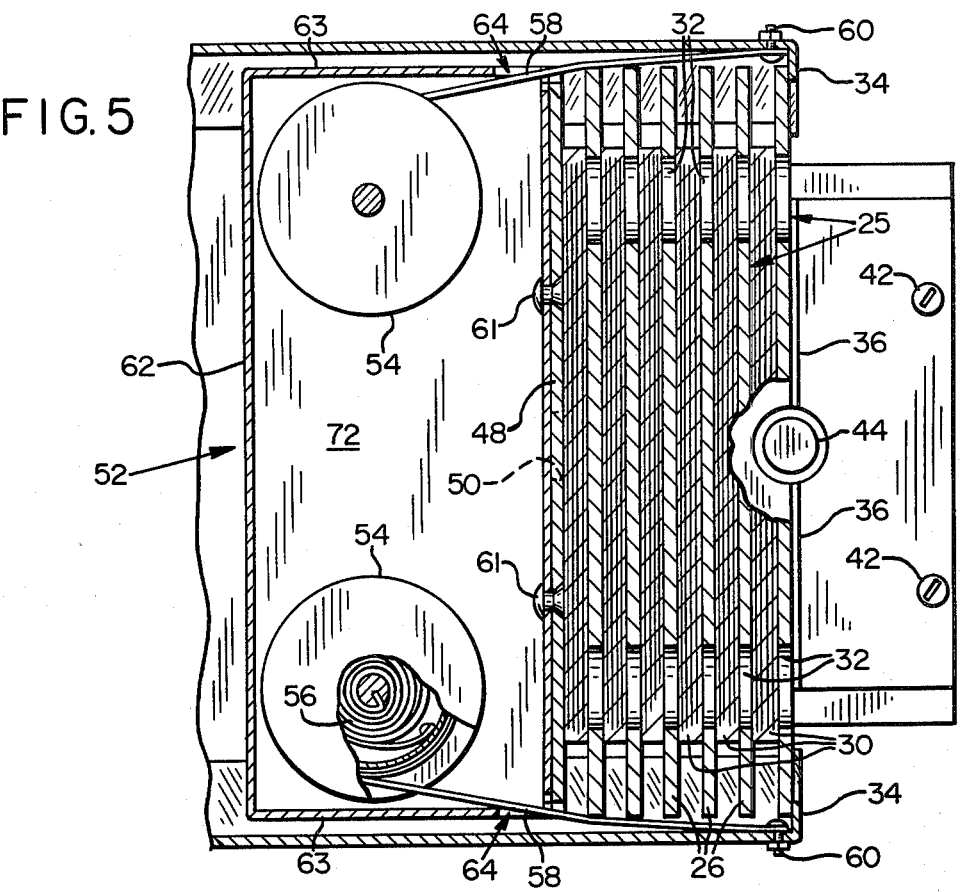
FIG. 5
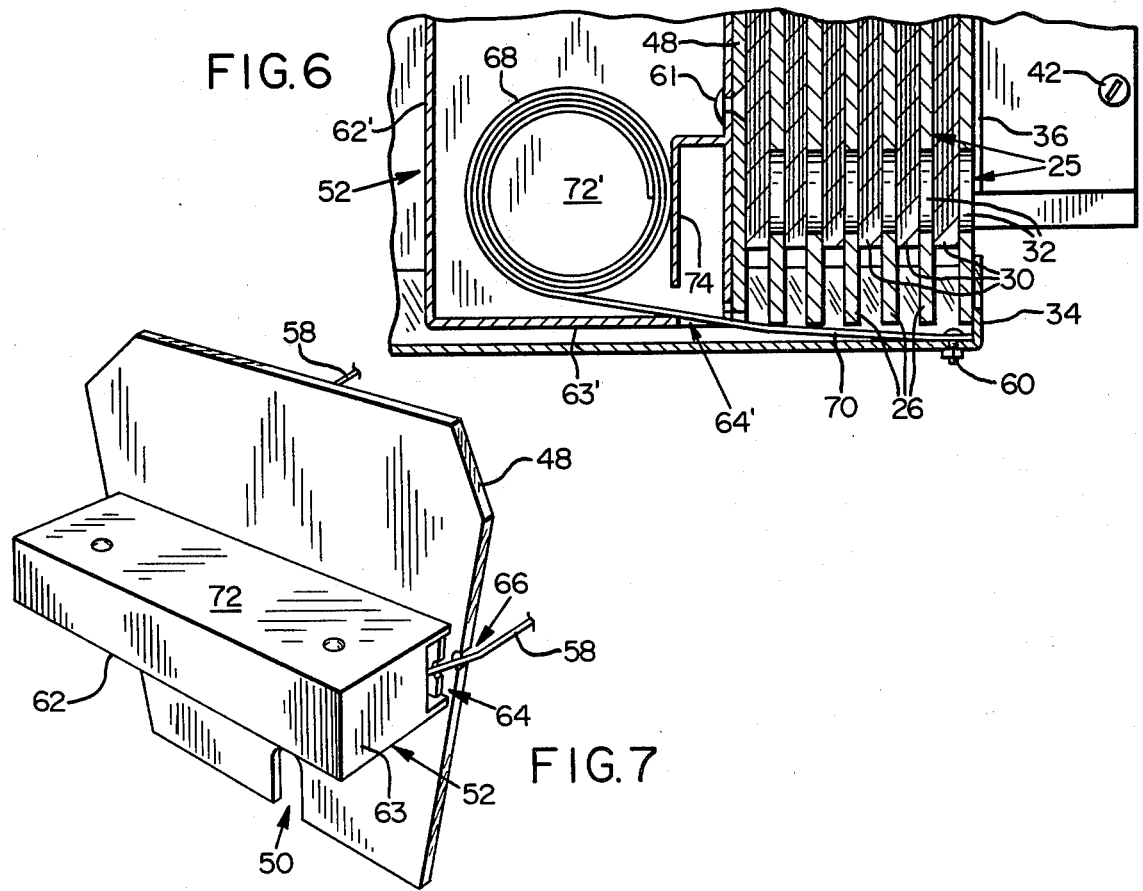
FIG. 6
FIG. 7

AERIAL MARKER LAUNCHER

BACKGROUND OF THE INVENTION

This invention relates to a device for use in marking the path of flight of an aircraft, particularly a device for discharging from an aircraft while in flight streamer-like markers of the class described in Tillay, U.S. Pat. No. 3,428,019. Such markers flutter to the ground and are highly visible from the air, thus indicating the aircraft's path of flight.

It is a common practice in agricultural operations to use aircraft to spread chemicals on a plot of land or the vegetation thereon. In order to be efficient, but yet thorough, in the application of these chemicals, the pilot needs to know his previous path of flight so he may parallel it as closely as possible on his next pass. Most chemicals thus deposited are colorless and do not per se provide a visible indication of their presence or absence.

Previously, pilots have relied on spotters, a person at each end of the field supporting a visible target, indicating the aircraft's last (or next) pass. Because of the toxic nature of most of the chemicals thus used, the spotters had extremely hazardous duty.

Marker launchers of the general class of the present invention have been used, automating the job of the spotters. This invention is an improvement over one such device, namely that described in U.S. Pat. No. 3,470,846 to Tillay, et al. That prior art device relied on air pressure, generated by the forward motion of the aircraft, to advance the markers toward the discharge or ejection end of the launcher.

Because of the manner of flight of such aircraft, sufficient air pressure is not always generated to bias the markers toward the ejection mechanism. This may lead to the markers becoming scrambled in the launcher and block its further operation.

Although the above malfunction may occur only a small percentage of the time, its occurrence does cause a considerable problem. If the launcher is jammed the pilot must either elect to spread his load inefficiently without benefit of the markers, or land with a full load of chemicals. The latter is dangerous and wasteful of flight time.

It is the general object of the present invention to provide an aerial marker launcher having increased reliability.

It is another object of this invention to provide a marker launcher having an improved assembly for advancing the markers toward the discharge or ejection end of the launcher.

It is yet another object of this invention to provide a marker launcher having an improved ejection mechanism.

It is a further object of this invention to provide a marker launcher which is easy to load.

It is a still further object of this invention to provide a marker launcher which is simple and inexpensive to manufacture.

Other objects and advantages of the present invention will be made apparent in the following specification and claims.

BRIEF SUMMARY OF THE INVENTION

In its basic concept the present invention is an apparatus for discharging streamer-like markers from an aircraft to mark the path thereof. The apparatus includes an elongated container which is attachable to an aircraft and configured to contain a plurality of markers in a stack, an ejector which is controllable by the pilot and operable to eject the markers one at a time from one end of the container, a pusher plate operable to push the remainder of the markers toward the ejection end as each one is ejected, and a spring assembly having a resiliently retractable extension member interengaging the pusher plate and a point on the container adjacent the ejection end for urging the pusher plate toward the ejection end of the container.

BRIEF DESCRIPTION OF THE DRAWINGS

FIG. 1 is a side elevation of the aerial marker launcher of the present invention, shown mounted on the wing of an aircraft.

FIG. 2 is a fragmentary side view of the marker used by the launcher of the present invention, shown in its expanded state.

FIG. 3 is an end elevation looking in the direction of the arrows of line 3—3 of FIG. 1 showing the ejection end of the launcher.

FIG. 4 is a fragmentary section taken along the line 4—4 of FIG. 3 showing the internal construction of the launcher including the pusher plate and spring assembly in a first embodiment.

FIG. 5 is a fragmentary section taken along the line 5—5 of FIG. 1 showing the arrangement of two spring assemblies in the first embodiment.

FIG. 6 is a fragmentary section similar to FIG. 5 showing the spring assembly of a second embodiment.

FIG. 7 is a top perspective view of the pusher plate as used in the first embodiment of the present invention.

DETAILED DESCRIPTION OF THE PREFERRED EMBODIMENTS

As shown in FIG. 1, the aerial marker launcher of the present invention preferably mounts on a wing 10 of an aircraft. It includes a container, generally shown at 12, which comprises a container body 14, a lid 16 hinged to the body, a nosecone 18 at the front of the container streamlining the launcher, and a rearward ejection opening 20.

A mounting bracket 22 is attached to the base of container body 14 and is mounted on the wing 10 by bolts 24. The launcher is carefully mounted so that none of its parts interfere with the operation of the aircraft.

The markers used in the present launcher are shown in FIGS. 2-6 generally at 25. One of the markers in its expanded state is shown in FIG. 2. Each marker includes a stiff base 26, which may be corrugated board. A reinforcing strip 28 is attached to, or may be formed integral with, the base. A flexible strip or streamer 30 is attached to the base on the same side thereof as the reinforcing strip. The streamer may be made of paper or plastic and is initially folded upon itself to form a compact package, several of which are illustrated in FIGS. 4-6.

FIG. 3 illustrates the preferred configuration of the marker base 26. The marker 25 is shown in solid line as it is held at the ejection end of the container 12, and in phantom line as it appears immediately after ejection. The base is substantially trapezoidal, and has holes 32 therein to allow passage of air through the base to the streamer 30.

The container body 14 is also trapezoidal in configuration as shown in FIG. 3. Side brackets 34 and bottom brackets 36 are operable to hold the rearmost marker 25 in position at the ejection opening 20. Flexible tabs 38 resist the ejection of the marker unless it is forceably pushed upwardly.

An ejection means is provided at the ejection end of the container. Preferably this comprises a solenoid 40 attached to the mounting bracket 22 by screws 42. The solenoid includes a push rod 44 which is shown in phantom line in FIGS. 3 and 4 in its extended position. Wires 46 extend from the solenoid and attach to a pilot controllable switch (not shown) and a battery or other power source (not shown). The push rod is operable to forceably push against the base 26 and the reinforcing strip 28 of the marker 25.

The markers 25 are pressed toward the ejection opening 20 of the container 12 by pusher plate 48 shown in FIGS. 4–7. The pusher plate is preferably configured similarly to the base 26 of one of the markers.

A notch 50, best shown in FIG. 7, provides a safety feature under special conditions. If all of the markers 25 have been ejected and the pusher plate is abutting side brackets 34 and bottom brackets 36, the push rod 44 may extend into notch 50 without ejecting the pusher plate. This protects both the solenoid 40 and the pusher plate from damage or loss.

The pusher plate 48 is driven by a spring drive assembly shown generally at 52 and including a resiliently retractable extension member attached to and extending between the pusher plate and the container 12 adjacent the ejection opening 20.

In a first embodiment, shown in FIGS. 4, 5 and 7, the spring assembly 52 includes a spool 54 mounted rotatably on the pusher plate 48, a spring 56, preferably located inside the spool and operable to apply torque to the spool, and a cable 58 wound around the spool and extendable therefrom against the resilient resistance of the spring. The cable is attached to the container 12 adjacent the ejection end thereof by bolt 60. Since the spring 56 resiliently urges the cable 58 to coil about the spool 54, the length of the cable from the spool to the bolt constitutes the resiliently retractable extension member of this embodiment.

A housing 62 covers the spring assembly and serves to keep dust and dirt out of the mechanism and otherwise protect it from being fouled. The housing is attached to the pusher plate 48 by rivets 61. In addition the housing side walls 72 serve as a mounting bracket to mount the spool 54 rotatably on the pusher plate 48. The end walls 63 of the housing have an opening 64 therein allowing passage of the extension member. The housing and pusher plate also include a semicircular notch 66 providing a passage for the extension member cable 58 as best shown in FIG. 7.

In the second embodiment, illustrated in FIG. 6, use is made of a resiliently retractable extension spring having a coil 68 and a free end 70. An extension spring is generally a ribbon of metal having a tendency to roll up into a coil. The free end is attached to the container 12 adjacent the ejection end, and the unreeled spring constitutes the resiliently retractable extension member of the second embodiment. The spring 68 replaces the housing 54, spring 56 and cable 58 of the first embodiment.

To confine the spring and protect it, a housing 62' is provided including side walls 72' on the top and bottom of the spring preventing its axial movement. Further included in the housing are end walls 63' having an opening 64' therein to allow passage of the extension member.

A bracket 74 is mounted between the side walls 72 and is operable to support coil 68 at a distance spaced apart from the pusher plate. This allows the spring to be under tension even with no markers in the container 12.

It can be seen that either embodiment lends itself to the incorporation of a second spring in the spring assembly and a second extension member extending from the second spring. This arrangement is illustrated in FIG. 5. It is particularly useful in balancing the force against the pusher plate.

OPERATION

Before take-off when the aircraft is loaded with chemicals the marker launcher of the present invention is loaded with markers 25. The pusher plate 48 is pulled away from the ejection end of the container 12. A stack of markers, with each marker oriented similarly, is placed in the container between the pusher plate and the ejection end. The bases 26 of the markers face rearwardly.

The resiliently retractable extension member urges the pusher plate resiliently toward the ejection end of the container. When the markers 25 are in place, the pusher plate is eased rearwardly against the end of the stack applying a rearward pressure against the stack of markers. Side brackets 34 and bottom brackets 36 prevent the markers from falling out the ejection opening 20.

The lid 16 is then closed and the marker launcher is ready to eject the markers 25 one by one.

In flight, as the aircraft completes a pass of an area on which it is spreading chemicals, the pilot pushes a button which activates solenoid 40. Push rod 44 extends up out of the solenoid, pushing against the base 26 and reinforcing strip 28 of the rearmost marker 25. As the marker is raised, flexible tabs 38 bend and push the top edge of the marker rearwardly, as shown in FIGS. 3 and 4. When the side and bottom edges of the marker clear side brackets 34 and bottom brackets 36 the marker falls away from the launcher and is thus ejected.

Push rod 44 retracts into solenoid 40. This leaves an empty space at the rear of the container 12 adjacent the ejection opening 20. Because of the tension in the extension members, the pusher plate 48 urges the stack of markers 25 rearwardly until the rearmost remaining marker comes into abutment with the side brackets 34 and bottom brackets 36. The launcher is then in condition to eject the next marker.

Should all of the markers 25 be ejected in the course of a flight, pusher plate 48 would abut side brackets 34 and bottom bracket 36. If solenoid 40 is then activated, push rod 44 may then extend into notch 50 in the bottom of the pusher plate. This prevents damage to the pusher plate or solenoid.

It can be seen from the foregoing description of the preferred embodiment that the present invention provides increased reliability in an aerial marker launcher, including a very compact spring assembly providing the necessary pressure to advance the markers to the ejection end of the launcher.

I claim:

1. An aerial marker launcher for dropping a series of markers from an aircraft, while it is in flight, to the ground to indicate its line of flight, each marker including a stiff base member and a flexible, streamer-like strip attached to one face of the base member, the launcher comprising:

(a) an elongated container having means to attach it to an aircraft, the container being configured to hold a plurality of markers in a stack and having an opening in one end thereof to allow ejection of the markers, (b) ejector means secured to the container and arranged to releasably engage the marker nearest the container opening and eject it from the container, (c) a pusher plate abutting the end of the stack inside the container and movable therein toward the container opening to position the markers one at a time for ejection by the ejector means, and (d) a spring assembly comprising a spool mounted rotatably on the pusher plate, a cable wound around the spool and extendable therefrom, the extended end of the cable being attached to the container adjacent said ejection opening, a spring operable to applied torque to the spool, and a housing attached to the pusher plate and covering the spool and having an opening therein adjacent the pusher plate to allow passage of the cable.

2. An aerial marker launcher for dropping a series of markers from an aircraft, while it is in flight, to the ground to indicate its line of flight, each marker including a stiff base member and flexible, streamer-like strip attached to one face of the base member, the launcher comprising:

(a) an elongated container having means to attach it to an aircraft, the container being configured to hold a plurality of markers in a stack and having an opening in one end thereof to allow ejection of the markers, (b) ejector means secured to the container and arranged to releasably engage the marker nearest the container opening and eject it from the container, (c) a pusher plate abutting the end of the stack inside the container and movable therein toward the container opening to position the markers one at a time for ejection by the ejector means, and (d) a spring assembly comprising a spool mounted rotatably on the pusher plate, a cable wound around the spool and extendable therefrom, the extended end of the cable being attached to the container adjacent said ejection opening, a spring operable to applied torque to the spool for urging the cable resiliently to coil around the spool, and a spool-mounting bracket attached to the pusher plate opposite the side which faces the stack.

3. An aerial marker launcher for dropping a series of markers from an aircraft, while it is in flight, to the ground to indicate its line of flight, each marker including a stiff base member and a flexible, streamer-like strip attached to one face of the base member, the launcher comprising:

(a) an elongated container having means to attach it to an aircraft, the container being configured to hold a plurality of markers in a stack and having an opening in one end thereof to allow ejection of the markers, (b) ejector means secured to the container and arranged to releasably engage the marker nearest the container opening and eject it from the container, the ejector means including a retractable plunger movable between a retracted position separated from the stiff base member of the marker and an extended position engaging said stiff base member and ejecting the marker from the container, (c) a pusher plate abutting the end of the stack inside the container and movable therein toward the container opening to position the markers one at a time for ejection by the ejector means, the pusher plate having a notch therein to register with the plunger of the ejector means to prevent ejection of the pusher plate from the container, and (d) drive means interengaging the container and pusher plate for moving the latter toward the container opening.

4. An aerial marker launcher for dropping a series of markers from an aircraft, while it is in flight, to the ground to indicate its line of flight, each marker including a stiff base member and a flexible, streamer-like strip attached to one face of the base member, the launcher comprising:

(a) an elongated container having means to attach it to an aircraft, the container being configured to hold a plurality of markers in a stack and having an opening in the rear end thereof to allow ejection of the markers.

(b) a pusher plate in the container for abutting the inner end of the stack of markers in the container and movable therein toward the container opening, (c) drive means interengaging the container and pusher plate for moving the latter toward the container opening, (d) side bracket means on the container extending inwardly at the ejection opening on opposite sides thereof for abutment by the sides of the base member of the rearmost marker, (e) a resilient tab on the container arranged to intercept the upper side of the base member of the rearmost marker for resiliently resisting upward movement of the marker, and (f) ejector means secured to the container and arranged to releasably engage the base member of the rearmost marker and move it upward against the resilient resistance of the resilient tab, the ejector means including a retractable plunger movable between a retracted position below the base member of the rearmost marker and an upwardly extended position engaging said base member and ejecting the marker from the container, (g) the pusher plate having a notch therein arranged to register with the plunger of the ejector means to prevent ejection of the pusher plate from the container.

* * * * *